US008725762B2

(12) United States Patent
Ishikawa et al.

(10) Patent No.: US 8,725,762 B2
(45) Date of Patent: May 13, 2014

(54) PREVENTING LEAKAGE OF INFORMATION OVER A NETWORK

(75) Inventors: Shunsuke Ishikawa, Yamato (JP); Ryoji Kurosawa, Yamoto (JP); Yuriko Nishikawa, Yamato (JP); Yoshinori Tahara, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 13/387,477

(22) PCT Filed: Jul. 7, 2010

(86) PCT No.: PCT/JP2010/061535
§ 371 (c)(1),
(2), (4) Date: Jan. 27, 2012

(87) PCT Pub. No.: WO2011/013490
PCT Pub. Date: Feb. 3, 2011

(65) Prior Publication Data
US 2012/0284299 A1 Nov. 8, 2012

(30) Foreign Application Priority Data
Jul. 28, 2009 (JP) .............................. 2009-175664

(51) Int. Cl.
*G06F 17/30* (2006.01)
(52) U.S. Cl.
USPC .......................................... 707/769; 707/757
(58) Field of Classification Search
CPC ............ G06F 11/3476; G06F 2201/87; G06F 17/30283; G06F 21/62; G06F 2221/2123
See application file for complete search history.

(56) References Cited

U.S. PATENT DOCUMENTS

| 6,745,180 B2 | 6/2004 | Yamanoue | |
|---|---|---|---|
| 2004/0078593 A1* | 4/2004 | Hind et al. | ..................... 713/201 |

(Continued)

FOREIGN PATENT DOCUMENTS

| JP | 11-259512 | 9/1999 |
|---|---|---|
| JP | 2002132813 | 5/2002 |
| JP | 2002-312377 | 10/2002 |

OTHER PUBLICATIONS

Hidetoshi Kido et al., "A Method to Protect Location Privacy Using Dummies and Its Cost Evaluation for Location-Based Services", DEWS2005 Collection of Papers, Proceedings of Data Engineering Workshop, 2005, pp. 1-10. (English Abstract).

(Continued)

*Primary Examiner* — Yuk Ting Choi
(74) *Attorney, Agent, or Firm* — A. Bruce Clay

(57) ABSTRACT

Information is acquired over a network by acquiring an original request including a current search value that specifies information to be acquired from a database. It is determined whether the information to be acquired by the original request is singular with respect to a request previously issued by the information processing apparatus and stored in a request log in which a history of search values is registered. A diffusion request is generated including a dummy request to dilute singularity of an access log related to the current search value to the database issued by the information processing apparatus where the original request is determined to be singular with respect to the current search value, the dummy request being generated from a dummy value that provides a different search value requesting information different from the information to be acquired. The diffusion request is issued as a search request to the database over the network. The search result information acquired by the diffusion request is extracted from a response to the search request.

15 Claims, 17 Drawing Sheets

(56) References Cited

U.S. PATENT DOCUMENTS

| | | | |
|---|---|---|---|
| 2004/0205114 A1* | 10/2004 | Kinoshita | 709/202 |
| 2005/0177559 A1* | 8/2005 | Nemoto | 707/3 |
| 2005/0177630 A1* | 8/2005 | Jolfaei | 709/224 |
| 2009/0112805 A1* | 4/2009 | Garbow et al. | 707/3 |
| 2010/0241641 A1* | 9/2010 | Byun et al. | 707/757 |

OTHER PUBLICATIONS

International Searching Authority, Written Opinion of the International Searching Authority for International Application No. PCT/JP2010/061535, Filed Jul. 7, 2010, Translation Mailed Feb. 16, 2012.

* cited by examiner

```
//determine request diffusion//
bool diffused ( candidate, period, target )
{
past_history = log( period );
after_request = request_central_coordinate ( past_history + candidate );
if ( distance ( after_request, target ) > threshold )
{
return true;
}
else
{
return false;
}
}
```
⎫
⎬ 900
⎭

```
//calculate central coordinate of request//
request_central_coordinate ( list )
{
//calculate central coordinate//
sumX = 0;
sumY = 0;
for ( i = 0 ; i <number_of_elements( list ) ; i++ )
{
sumX = sumX + list[i].X;
sumY = sumY + list[i].Y;
}
central.X = sumX / number_of_elements( list );
central.Y = sumY / number_of_elements( list );
return central;
}
```
⎫
⎬ 910
⎭

FIG. 9

```
//determine request diffusion//
is number of accesses to target characteristic? (target, past request history of all category elements)
{
    //number of accesses to target must be close to average value of numbers of accesses to all category
    elements if (|average of numbers of requests of category elements - number of requests of target|) >
    threshold)
    return false;
    return true;
}
candidate acquire dummy access candidate (target)
{
    return randomly acquire one of all category elements other than target
}
//issue diffusion request//
diffusion request (target)
{
    acquire past request history of all category elements access to target (target, past request history of all
    category elements)
    access to target (target, past request history of all category elements)
    {
        new request history = past request history of all category elements + new access to target
        while (is number of accesses to target characteristic? (target, new request history) == false)
        dummy access candidate = acquire dummy access candidate (target);
        access (dummy access candidate)
    }
    access (target)
}
```

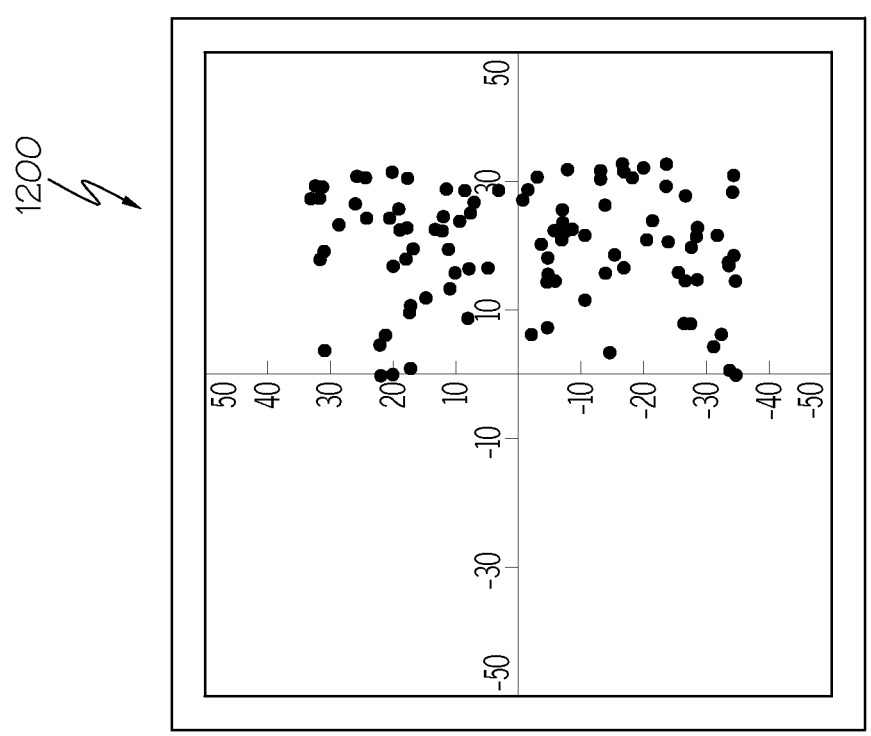

PREVENTING LEAKAGE OF INFORMATION OVER A NETWORK

BACKGROUND

The present invention relates, in general, to network technology and, more particularly, to a technique for preventing leakage of information that can occur during acquisition of information over a network.

Recently, with the progress in network infrastructure and computer technology, more and more personal computers, work stations and server computers have become interconnected to share information. To achieve information sharing, typically, a client computer such as a personal computer (referred to simply as a client hereinafter) issues a request for information to a web server that has information accumulated therein. In response to the request, the web server sends the information corresponding to the request to the client, and the client can acquire the information it requested.

The request sent from the client to the server contains a value that specifies a numerical data set or a keyword, and the server refers to the value and issues a query to a database, or the like, thereby extracting information from the database. That is, according to the conventional information search method, information on what the client is currently interested in will be disclosed to the server.

In the case of a trusted web server, the conventional information search method is not significantly problematic. Even in the case of a trusted web server, however, a searching entity such as an individual and a company needs to inform the web server of what information the searching entity is currently interested in.

With the progress in browsing technology, the so-called mashup system, such as Web 2.0, has become popular. By concentrating information managed by a plurality of web servers onto a single information processing apparatus, information accessibility is improved. The mashup system comprises a client, a mashup server and a plurality of information servers.

The mashup server may be installed at the premises of a company or may be a web server dedicated for the mashup processing provided on the Internet by an Internet service provider (ISP). Each information server, provided by an ISP, or the like, searches a database managed by it for information corresponding to the request from the client, and sends the information to the mashup server. The mashup server appropriately distributes the acquired information so that the information acquired from the plurality of information servers is displayed on the client via a browser program, or the like.

In the mashup system, a plurality of information servers, which correspond to various kinds of information requested by the client, receive the request issued by the client. The request, for example, comprises a structure query language (SQL) statement containing a search word or conditional formula used to search for information to be acquired. Each information server acquires information corresponding to the request by extracting the search condition from the received request and searching the database managed by it. Here, a problem arises in that all the information servers to which the client connects are not always trustworthy. Furthermore, even on a trusted information server, the purpose of the search by the client may be implicitly uncovered through data mining and request tendency analysis during log analysis in the information server, from the contents of the request sent to the information server.

Thus, as this network technology becomes more popular and the information accumulated on networks becomes more value-added, a problem of "gentle information leakage" occurs in information search protocols. The term "gentle information leakage," as used herein, refers to leakage of the intention or purpose of a search conducted by a group on a network as a result of statistical analysis of network accesses from the group by an information server.

BRIEF SUMMARY

According to one embodiment of the present invention, an information processing apparatus acquires information over a network. The apparatus comprises a processor and memory connected to the processor. The memory is encoded with instructions for execution. An original request is acquired including a current search value that specifies information to be acquired from a database. It is determined whether or not the information to be acquired by the original request is singular with respect to a request previously issued by the information processing apparatus and stored in a request log in which a history of search values is registered. A diffusion request is generated including a dummy request to dilute singularity of an access log related to the current search value to the database issued by the information processing apparatus where the original request is determined to be singular with respect to the current search value, the dummy request being generated from a dummy value that provides a different search value requesting information different from the information to be acquired. The diffusion request is issued as a search request to the database over the network. The search result information acquired by the diffusion request is extracted from a response to the search request.

According to one embodiment of the present invention, a method acquires information over a network. An original request is acquired, using a processor, that includes a current search value specifying information to be acquired from a database. It is determined whether or not the information to be acquired by the original request is singular with respect to a request previously issued by the information processing apparatus as stored in a request log in a memory in which a history of search values is registered. A diffusion request is generated including a dummy request to dilute singularity of an access log related to the current search value to the database issued by the information processing apparatus where the original request is determined to be singular with respect to the current search value. The dummy request is generated from a dummy value that provides a different search value requesting information different from the information to be acquired. A diffusion request is issued as a search request to the database over the network. The information is extracted from information acquired by the diffusion request from a response to the search request.

A computer program product acquires information over a network. Computer readable program code is configured to acquire an original request comprising a current search value that specifies information to be acquired from a database. Computer readable program code is configured to determine whether or not the information to be acquired by the original request is singular with respect to a request previously stored in a request log in which a history of search values is registered. Computer readable program code is configured to generate a diffusion request comprising a dummy request to dilute singularity of an access log related to the current search value to the database in a case where singularity with respect to the current search value is determined, the dummy request being generated from a dummy value that provides a different search value that requests information different from the information to be acquired. Computer readable program code is configured to issue the diffusion request as a search request to the database over a network. Computer readable program code is configured to extract information acquired by the diffusion request from a response to the search request.

BRIEF DESCRIPTION OF THE SEVERAL VIEWS OF THE DRAWINGS

FIG. 9 is a diagram showing pseudo codes in the process described with reference to FIG. 8;

FIG. 11 shows an illustrative pseudo code for performing the processing shown in FIG. 10;

FIGS. 12A, 12B, and 12C show diffusion conditions of the contents of diffusion requests generated in an embodiment in which map data is searched for;

DETAILED DESCRIPTION

Figure 1:
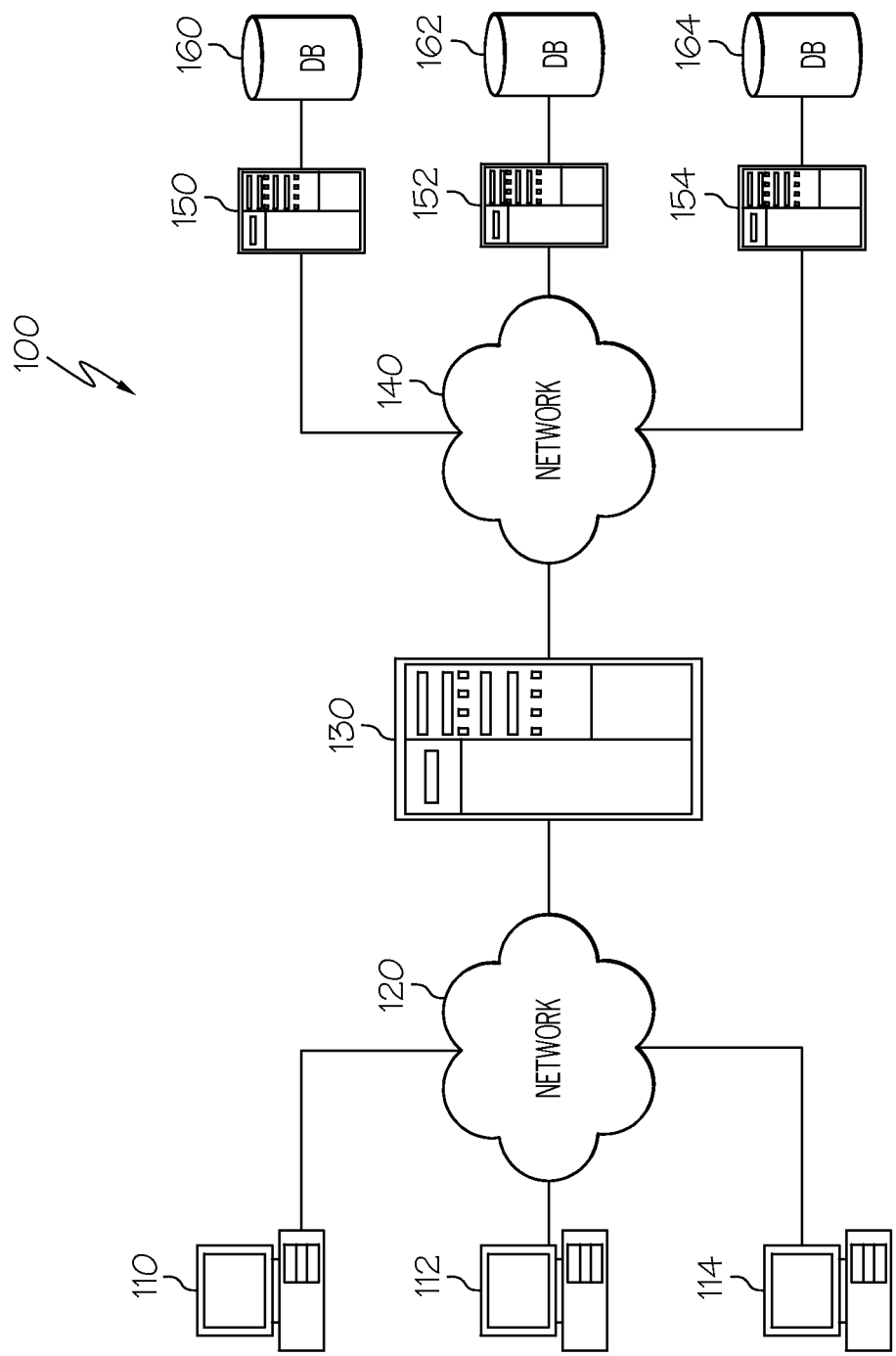
FIG. 1 is a diagram showing a web system according to one embodiment of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable media (memory or device) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

According to conventional techniques, in order to prevent information leakage during a search, the search apparatus generates a modified search formula including the original search conditions, uses the modified search formula to issue a search request to a database and acquire broader search results, and then searches again the broader search results under the original search conditions to acquire the originally requested search results.

However, enormous amounts of information can be accessed over networks. Thus, if clients or gateway servers that conduct searches acquire the search results under the broader search conditions, the storage space consumption and the overhead of the re-searching, processing, and the data editing processing are not negligible, implementation of software at the level of a small-scale database system is required, and the information search system itself has to be redundant. Thus, substantial modifications to both the hardware and software resources are required.

According to conventional methods for preventing information leakage, which expand the original search conditions to broader concepts or generate additional search conditions to expand the search range, the resulting broader search conditions have to include the original search conditions. However, broader search conditions are not intended to prevent leakage of the purpose of the search conducted by the client, so that accidental leakage of the purpose of the search conducted by the client, that is, gentle information leakage, cannot be prevented.

The present invention has been devised in view of the fact that gentle information leakage occurs in conventional information searches. According to the present invention, a past request log is statistically analyzed. And if a request for information is singular in the history of past requests, a plurality of dummy requests including randomly selected dummy values are generated, and a diffusion request including the plurality of dummy requests is generated.

The diffusion request is generated when a search target input by a searching entity is supposed to be singular in the past request log and prevents the access log accumulated in a web server that conducts the search processing from being analyzed and proved to be characteristic by data mining, thereby improving the data mining resistance of the request issued by the searching entity.

FIG. 1 shows a web system 100 according to one embodiment of the present invention. The web system 100 comprises clients 110, 112, and 114, a mashup server 130, and web servers 150, 152, and 154. The clients 110, 112, and 114 and the mashup server 130 are connected to each other via a network 120 such as a LAN, a WAN, or the Internet. The mashup server 130 is also connected to the web servers 150, 152, and 154 via a network 140. The network 140 is not limited to a particular type but may be a wide area network, such as the Internet.

In one embodiment, the mashup server 130 can function as part of a gateway server of a company. In another embodiment, the mashup server 130 can be installed in an internet service provider (ISP) that offers services according to a paradigm such as Web 2.0. Each web server 150, 152, and 154 manages a database 160, 162, and 164, respectively, and can provide information in response to a request received via the network 140. In one embodiment, the server 150 is implemented as a company information service providing server, and the server 152 is implemented as a stock price information service providing server. The server 154 is implemented as a map information service providing server for processing an individual request from the mashup server 130 and sends the processing result to the mashup server 130.

Each client 110, 112, and 114 uses a plurality of application services to acquire information. For example, the client 110 acquires information corresponding to the original request issued by it via the mashup server 130. The mashup server 130 stores the information received from the plurality of web servers 150, 152, and 154 in association with the client 110, and presents the information to the client 110 as composite information.

For example, in the case where the client 110 wants to acquire company information, stock price information and map information about a particular company at the same time, the mashup server 130 generates a diffusion request to be sent to the web servers 150, 152, and 154 that provide application services, based on the original request sent from the client 110. Then, the mashup server 130 sends the diffusion request to each web server 150, 152, and 154, extracts the result corresponding to the original request from the information acquired in response to the diffusion request, and sends the result to the client 110 as composite information by combining the information with a web page, for example.

The term "diffusion request," as used herein, means a request that corresponds to the type of a search target included in the original request issued by the client, and is generated for each attribute of the search target, and is sent to the web servers 150, 152, and 154. The diffusion request is generated so as to make it difficult for the web server to analyze the characteristics of the original request by statistical data mining of the access log. The diffusion request is generated in the form of a single request or a request set containing a dummy value.

The clients 110, 112, and 114 can be implemented by using a personal computer or a work station, and the microprocessor (MPU) thereof can incorporate any known single-core processor or multi-core processor. The clients 110 to 114 can be under the control of any known operating system such as WINDOWS®, UNIX®, LINUX® and MAC OS. The clients 110 to 114 can incorporate browser software such as Internet Explorer®, Mozilla®, Opera® and Firefox® in order to access the mashup server 130 or the web servers 150, 152, and 154.

Data transmission/reception between the clients 110, 112, and 114 and the mashup server 130, and between the mashup server 130 and the web servers 150, 152, and 154, occurs via a file transfer protocol such as HTTP and HTTPS using a transaction protocol such as TCP/IP. In order to access the databases of the web servers 150, 152, and 154, the mashup server 130 can incorporate Java Database Connectivity (JDBC) and Open Database Connectivity (ODBC) and connect to the web server 150, 152, or 154 via an application level protocol defined by JDBC, or the like.

In one embodiment shown in FIG. 1, a request issued by the client 110 is intercepted by the mashup server 130. The mashup server 130 refers to a past request log to perform a statistical processing. As a result of the statistical processing, if the mashup server 130 determines from the request history that a search value for specifying the information to be acquired included in the request can reflect a particular search intension, the mashup server 130 generates the diffusion request and issues the diffusion request to the web servers 150, 152, and 154 that manage the search target information. Each web server 150, 152, and 154 receives the diffusion request, searches the database 160, 162, and 164, respectively, for information corresponding to the request in order to extract the information, and sends the information back to the mashup server as a response. Based on the responses from the web servers 150, 152, and 154, the mashup server 130 constructs a web page including display regions for displaying the responses on a desktop screen and displays the responses in the respective allocated display regions so that the client 110, having issued the request, can browse.

Figure 2:
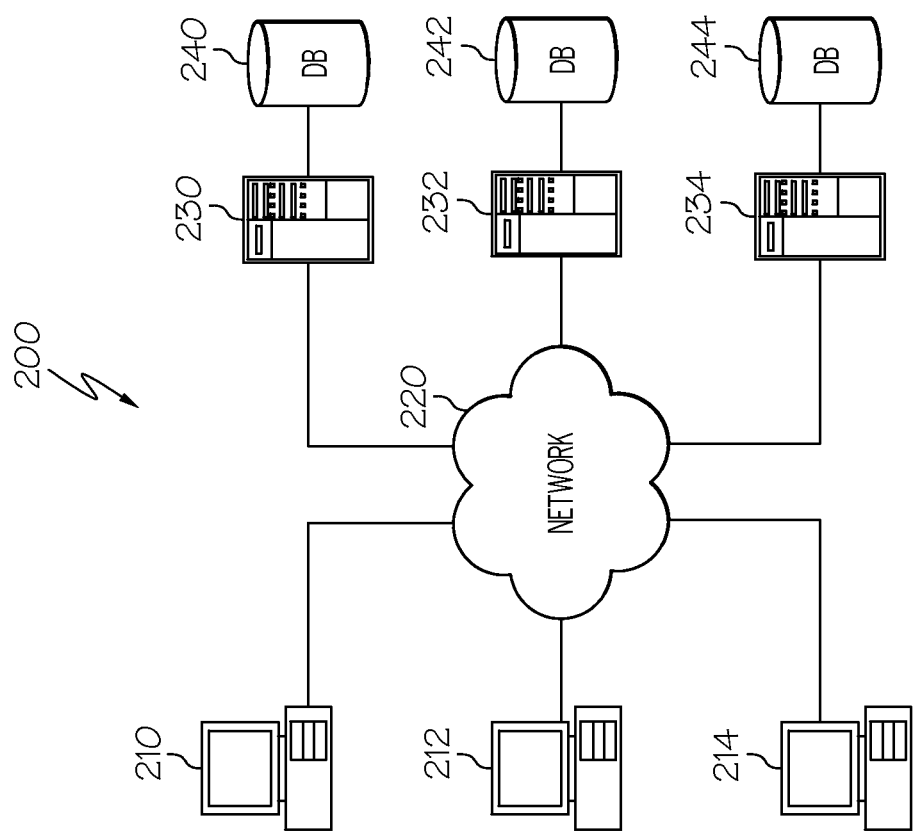
FIG. 2 is a diagram showing a web system according to another embodiment of the present invention.

FIG. 2 shows a web system 200 according to another embodiment. In the web system 200, a plurality of clients 210, 212, and 214 incorporate a mashup application implemented as an extension application for a web browser, such as a plug-in program or an add-in program. Accordingly, the web system 200 does not incorporate a dedicated server such as the mashup server 130 of FIG. 1. In FIG. 2, the functionality of the mashup server 130 of FIG. 1 is provided by the clients 210, 212, and 214, which generate a diffusion request to be issued to each web server 230, 232, and 234 from an original request, issue the diffusion request to each web server 230, 232, and 234, and filters the search results corresponding to the diffusion request to display the search results as composite information on a browser program.

The web servers 230, 232, and 234 have the same configuration as the web serves in the embodiment shown in FIG. 1 and send search result information to the client 210, or the like, in response to the diffusion request from the client 210.

When the diffusion request is generated as a single request, the diffusion request is combined by the OR operator with a search value that specifies the search target of a dummy request. In the case where the diffusion request is generated as a request set, the request set is generated to include a plurality of dummy requests containing dummy values that statistically make the access log uniform, for example, make the frequency of occurrence of the search target appear as white noise. In any case, the contents of the dummy request is selected so as to average the search targets over the time scale to prevent the search intention on the client side from being extracted on the web server side by data mining with reference to the request log. Note that the diffusion request may contain the original request or may not contain the original request depending upon the attribute of the information to be searched.

Figure 3:
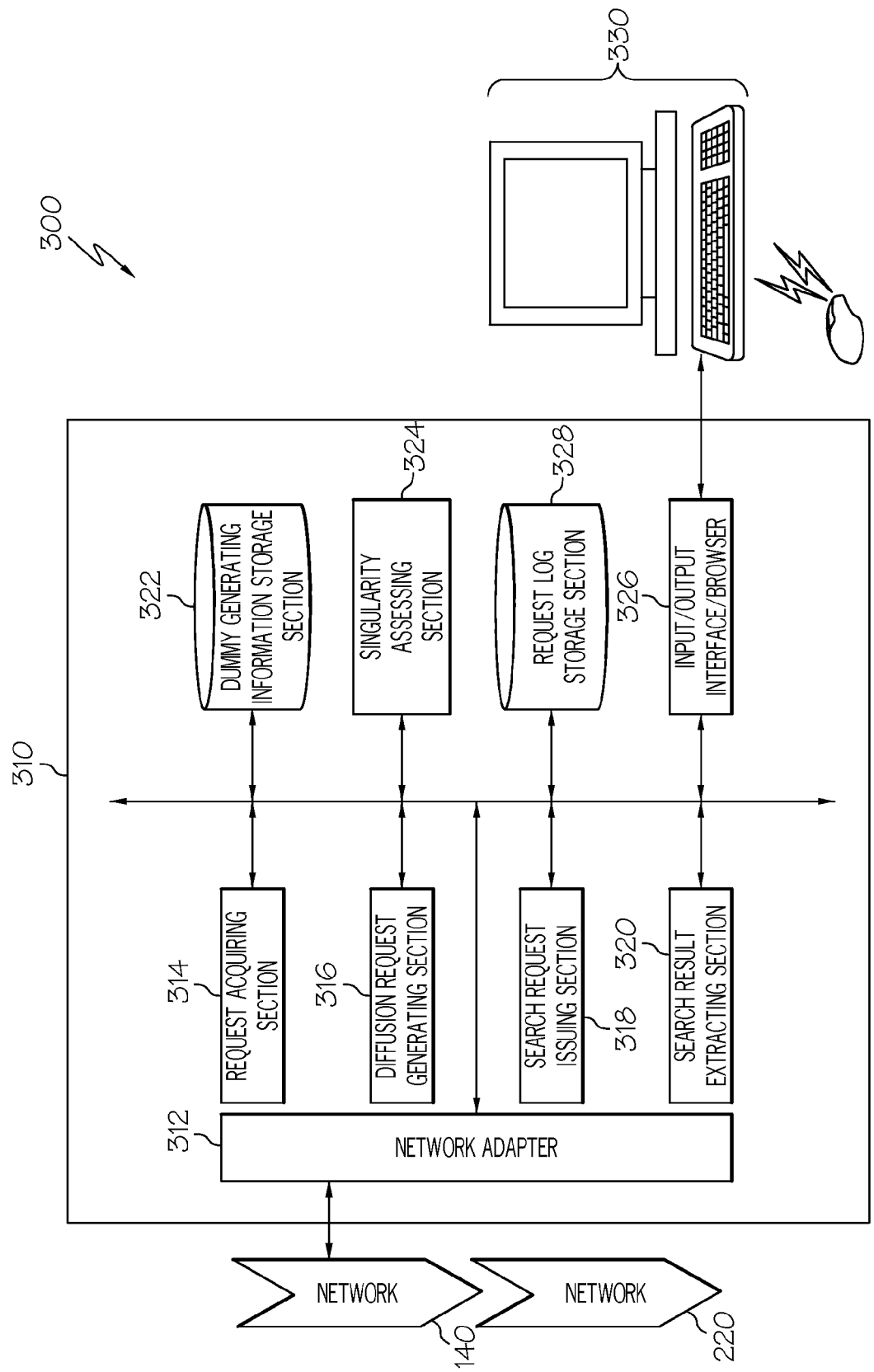
FIG. 3 is a diagram showing functional blocks of an information processing system that generates a diffusion request according to one embodiment.

FIG. 3 shows functional blocks of an information processing system 300 that generates a diffusion request according to this embodiment. The information processing system 300 shown in FIG. 3 corresponds to the mashup server 130 in the embodiment shown in FIG. 1 and to the clients 210 to 214 in the embodiment shown in FIG. 2. Although the functional blocks may be variably implemented as server applications or client applications in the embodiments, the functional blocks of the information processing system 300 are implemented by a microprocessor executing a program loaded into a RAM as an execution space for making an information processing apparatus serve as the respective functional means.

As shown in FIG. 3, the information processing system 300 comprises an information processing apparatus 310 and an input/output apparatus 330 including a display unit, a keyboard, a mouse, and the like. The information processing apparatus 310 transmits a diffusion request to the network 140 or 220 via a network adapter 312 and receives a response from a web server corresponding to the diffusion request. The information processing apparatus 310 further comprises a request acquiring section 314, a diffusion request generating section 316 and a dummy generating information storage section 322. The information processing apparatus 310 further comprises a request log storage section 328 that stores requests sent from the information processing apparatus 310 to the web servers in a chronological order.

In one embodiment in which the information processing apparatus 310 is implemented as the mashup server 130 (see FIG. 1), the request acquiring section 314 acquires the original requests from the clients 110, 112, and 114 via the network 120. In the case where the mashup server 130 is not used, and the information processing apparatus 310 accesses the web servers 230, 232, and 234 without going through the mashup server 130 (see FIG. 2), the request acquiring section 314 acquires the original request including a search condition input by an operator via the input/output apparatus 330. The diffusion request generating section 316 refers to the request log storage section 328 to determine whether the contents of the original request acquired by the request acquiring section 314 is singular or not in the past request log.

In response to the determination result, the diffusion request generating section 316 acquires a dummy value used for generating the diffusion request from the dummy generating information storage section 322. The diffusion request generating section 316 continues acquiring dummy values and generating dummy requests by including the dummy values in the diffusion request until a singularity assessing section 324 determines that the particular search target is not singular. The determination of the singularity of the original request can be made by the mashup server 130 or the client 210, 212, and 214 using a threshold, or the like, set for the number of occurrences of the search target within a particular time scale with regard to the request issuing managed by it. Alternatively, depending on the processing capacity of the information processing apparatus 310, the determination of the singularity may be made by a more advanced statistical processing.

In one embodiment, the processing by which the diffusion request generating section 316 generates the diffusion request varies with the attribute of the data processed by the web server 150, 152, or 154. In this embodiment, the diffusion request is generated to make it difficult to statistically analyze the chronological behavior with respect to a threshold of a particular target in the access log managed by each web server 150, 152, or 154. The search target information is not limited to particular information but, in one embodiment, is sorted into information with a continuous attribute and information with a discrete attribute.

The "information with a continuous attribute" is defined as information with such an attribute that a value that characterizes the information to be searched for, such as a position coordinate, a longitude, a latitude, an altitude, a time and a period, can be acquired from homogeneous information excluding the data to be searched for by a preset operation such as extrapolation, interpolation and displacement. For example, the information with a continuous attribute is a position coordinate, or latitude, or longitude data.

On the other hand, the "information with a discrete attribute" is defined as information with such an attribute that the data can vary independently of other homogeneous information, and the data to be searched for has to be acquired by direct access. For example, the information with a discrete attribute is stock price information, achievement information, or mergers and acquisitions (M & A) information about a company or information on other company or group activities.

The dummy generating information storage section 322 can be implemented as a database or a table, in which company information such as the name, the address and the latitude and longitude can be registered in association with each other so as to correspond to the attribute of the requested information. In another embodiment, if the information to be acquired is discrete information such as the stock price, the achievement, a product and a topic of a particular company, information that can be used as a dummy value can be registered for each category in order to decrease the singularity of the original request on an information attribute basis.

The singularity assessing section 324 receives the original request and analyzes the request log. If the received original request deviates from the average value of the access information for the request log, the singularity assessing section 324 refers to dummy generating information and makes the diffusion request generating section 316 continue generating diffusion requests including dummy requests including dummy values until it is determined from the request log that the original request is not singular.

The information processing apparatus 310 comprises a search request issuing section 318 and a search result extracting section 320. The search request issuing section 318 sets each of the original request and the generated dummy request, including the dummy value, to SQL query and issues the requests to the web servers via the network 140, 220. Based on whether the information to be acquired has a continuous or discrete attribute, the diffusion request generating section determines whether or not to pass the value specified in the original request to the search request issuing section 318.

More specifically, if the original request is for information with a continuous attribute, described as a numerical data set, a vector or the like, the information specified in the original request can be acquired by using extrapolation, interpolation or relative difference even if the value specified in the original request is not set in the search request. Thus, in the case where information with a continuous attribute is requested, the dummy request is not a request for the target information but is generated so that the web server 154 can reach the target information in response to another request from the client.

On the other hand, if the information has a discrete attribute specified by stock price information, a company name, an organization name, a search character string, or the like, the intended search cannot be achieved by any other means than direct search for the target information. Thus, the diffusion request generating section 316 generates a dummy request as a request for information that is homogeneous with the search target information but is different from the search target by using a value described in the original request, and passes the dummy request along with the original request to the search request issuing section 318 to generate the diffusion request. Accordingly, the search result extracting section 320 receives not only a response to the dummy request but also a response to the original request.

The search result extracting section 320 performs a filtering process on the search result sent from the web server, as required, and displays the search result on the display unit of the input/output apparatus 330 via an input/output interface/browser 326. In addition, if a map or the like is acquired as the search result, the operator of the information processing apparatus 310 adjusts the display region or the scale with a mouse, or the like, additionally issues a relative movement request, or the like, and updates the search result as required so as to be able to access the information to be acquired in response to the original request.

Figure 4:
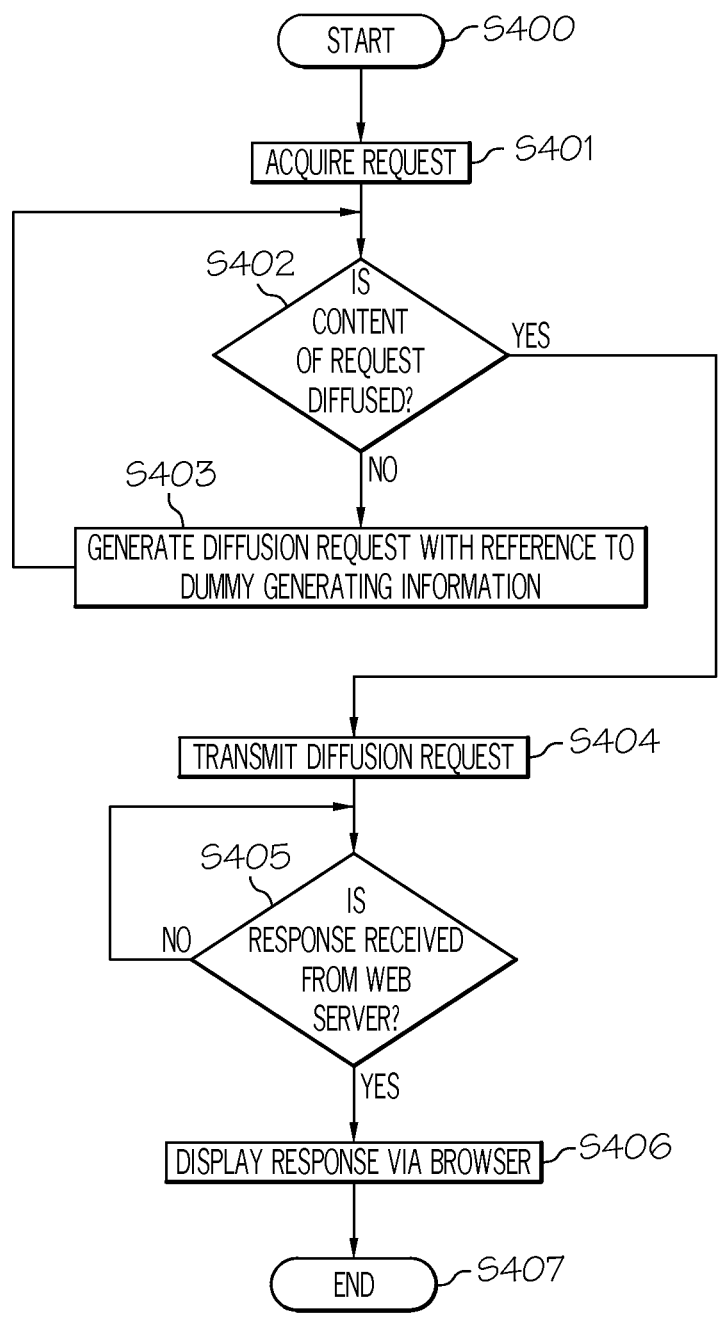
FIG. 4 is a flow chart for illustrating an information processing method according to one embodiment.

FIG. 4 is a flowchart for illustrating an information processing method according to one embodiment. In FIG. 4, the process starts at step S400, and then, in step S401, an original request is acquired. Depending on whether the embodiment shown in FIG. 1 or the embodiment shown in FIG. 2 is used, the information processing apparatus 310 acquires the original request from the network 120 or the input/output apparatus 330. For example, it is assumed that the search targets to be acquired are company information (denoted by $C_i$), stock price information (denoted by $S_i$), and map information (denoted by $G_i$), and the original request is generated to acquire composite information $\{C_i, S_i, G_i\}$. The information processing apparatus 310 separates the search request included in the original request. Then, in step S402, the information processing apparatus 310 invokes the singularity assessing section 324 to first determine whether or not each search request included in the original request is diffused in terms of time. The processing performed by the singularity assessing section 324 will be described in detail later.

If it is determined with reference to the request log that the request to be sent to the web server is not diffused in terms of contents or time (if the determination result is NO), the process proceeds to step S403, in which a diffusion request is generated with reference to dummy generating information, and then returns to step S402, in which it is determined whether or not the contents of the request are diffused.

If it is determined by comparison with the request log in step S402 that the contents of the request are diffused or, in other words, are not singular (if the determination result is YES), the request is transmitted in step S404.

In step S405, it is determined whether or not responses from the web servers are received. If the responses are not completely received (if the determination result is NO), the process is repeated until the responses are completely received. On the other hand, if it is determined in step S405 that the responses are completely received from the web servers (if the determination result is YES), in step S406, the information processing apparatus 310 merges the responses in association with the original request and displays the responses with a browser. The processing in step S406 may include a processing of filtering data to be browsed, depending on the attribute of the received data. When browsing on the display apparatus of the client is completed, the process ends in step S407 and waits for input of the next original request.

Figure 5:
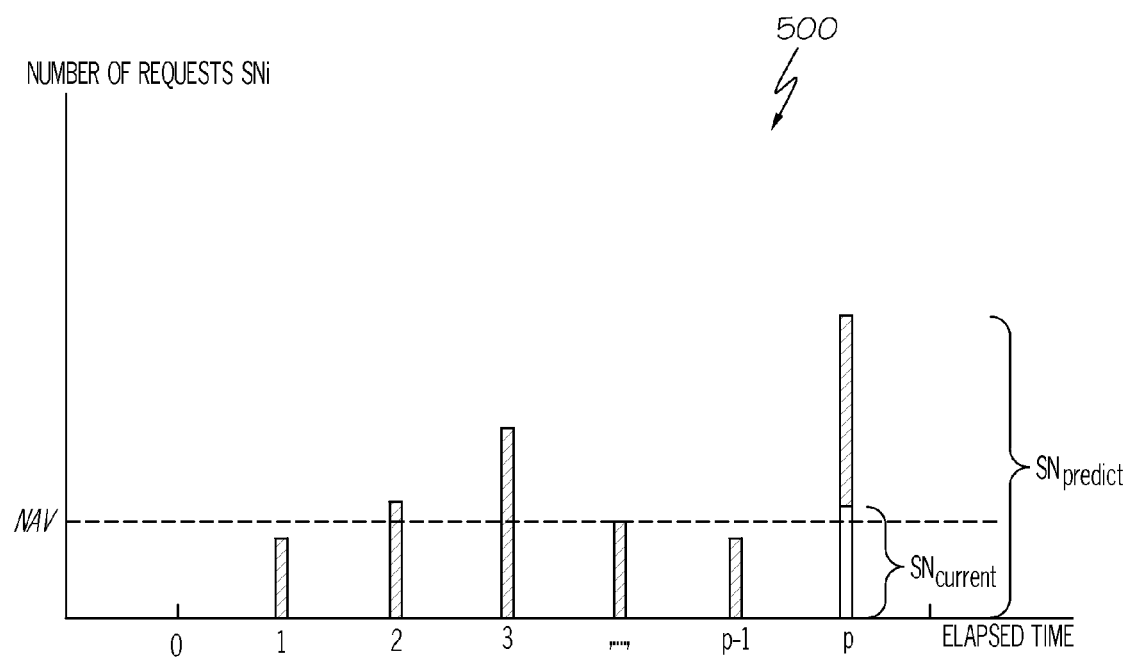
FIG. 5 is a diagram showing a request log for a particular search target included in an original request.

In the following, an illustrative processing performed by the singularity assessing section 324 according to one embodiment will be described. FIG. 5 shows a request log 500 for particular search targets included in the original request for illustrative purposes. In FIG. 5, the vertical axis indicates the cumulative number of requests SN, for a particular search target included in the original requests within an i-th time chunk (I=0, . . . , p, where p represents a non-negative integer), and the horizontal axis indicates the time elapsed. The time chunk can be appropriately set to be a minute, an hour, a day, a week, a month or the like to dilute the singularity of the original request. The request log 500 can be generated on a request issuer basis and accumulated. The request issuer may be a client, a business place or a company.

Whether the original requests are for the same search target or not can be determined based on text matching for a particular company name if the search target is company information or text matching for a particular company name or a particular stock code if the search target is stock price information, for example. If the search target is map information or other information specified by numerical value data, the determination can be made based on whether or not numerical values indicating the longitude and the latitude fall within a range of numerical values set around a particular longitude and a particular latitude. In the search for map information, the preset range of longitudes and latitudes can be varied depending on whether the relevant area is an urban area or not. The identity of search targets may be determined based on whether or not there are common landmarks within a specified particular area.

From the start of recording of the request log 500, the information processing apparatus 310 registers the search targets included in the issued original requests as the number of occurrences N for each search target within a time chunk provided at appropriate processing intervals. In the time chunk in which the request log 500 is currently being accumulated, the number of occurrences of the original requests including a search target of interest is detected on an original request basis.

When the time chunk ends in which the request log 500 is currently being accumulated, the singularity assessing section 324 checks the rate of increase of the search target of interest per request and predicts whether or not the time chunk becomes singular in the request log 500, thereby determining the characteristics of the search target in the currently considered time chunk $TC_p$. As shown in FIG. 5, in the time chunk immediately after recording of the request log is started, any original request issued is determined to be singular, and a diffusion request is generated.

Since the search request history is accumulated with time as the recording of the request log 500 proceeds, the past history has to be taken into consideration in the determination of whether the currently considered search target is singular or not. Here, it is assumed that the average value of the numbers of requests of a particular search target over the time chunks $TC_i$ preceding the current time chunk $TC_p$ is denoted by $N_{av}$, and the expected number of requests of the search target in the current time chunk $TC_p$ is denoted by $SN_p$. Then, in the case where the past history is taken into consideration in the determination of the characteristics of a particular search target, the characteristics of the search target can be determined according to the following formula (1), that is, based on whether or not the singularity index $SN_p$ is equal to larger than the average value $N_{av}$ plus a probable error.

$$SN_p \geq (N_{av} + \alpha\tau_{error}) \quad (1)$$

In the formula (1), $\sigma_{error}$ represents a probable error of the number of requests of the search target in the time chunks involved with the average value $N_{av}$, and $\alpha$ represents a positive real number. Preferably, $\alpha \geq 1$. $N_{av}$ is given by the following formula (2) and is updated each time the current time chunk for recording ends.

$$N_{av} = \left(\sum_{i=0}^{p} SN_i\right) / p \quad (2)$$

In the formula (1), the value p that identifies a time chunk increases as the recording of the request log proceeds, and the first time chunk in which the singularity assess processing is started forms a singular point. The processing is started on the assumption that all the search values are singular for p=0, because the time chunk is singular. Besides, all the search values are also determined to be singular in the case where no request occurs before the current time chunk $TC_p$ and $SN_p$ requests are issued in the current time chunk $TC_p$ for the first time. However, no special processing is performed and the determination is made based on the formula (1) described above, as far as p>0. In addition, it is unlikely that there is not the same search target in the past history. Thus, if it is assumed that a request log that does not include a particular search intention for a particular search target can be approximated as white noise centered about $N_{av}$ over the time chunks, $SN_p$ can be defined by using a probability density function given by a binomial distribution and a variance. Furthermore, if it is supposed that there is a relationship between search targets, the request log 500 can be assumed to be a multidimensional normal distribution, and the relationship singularity of the search target can be determined by using the multidimensional normal distribution and a variance-covariance matrix or the like.

In FIG. 5, the last time chunk is the time chunk in which the request log is currently being recorded, and the cumulative number of occurrences of a search value that specifies a particular search target is $SN_{current}$ at this point in time. Assuming that the number increases at this rate, the singularity assessing section 324 predicts that the number of occurrences of the search value increases to $SN_{predict}$ when the time chunk ends and determines the singularity according to the above-described formula (1) based on this prediction. An embodiment of the predictive determination according to this embodiment will be described in more detail later.

Figure 6:
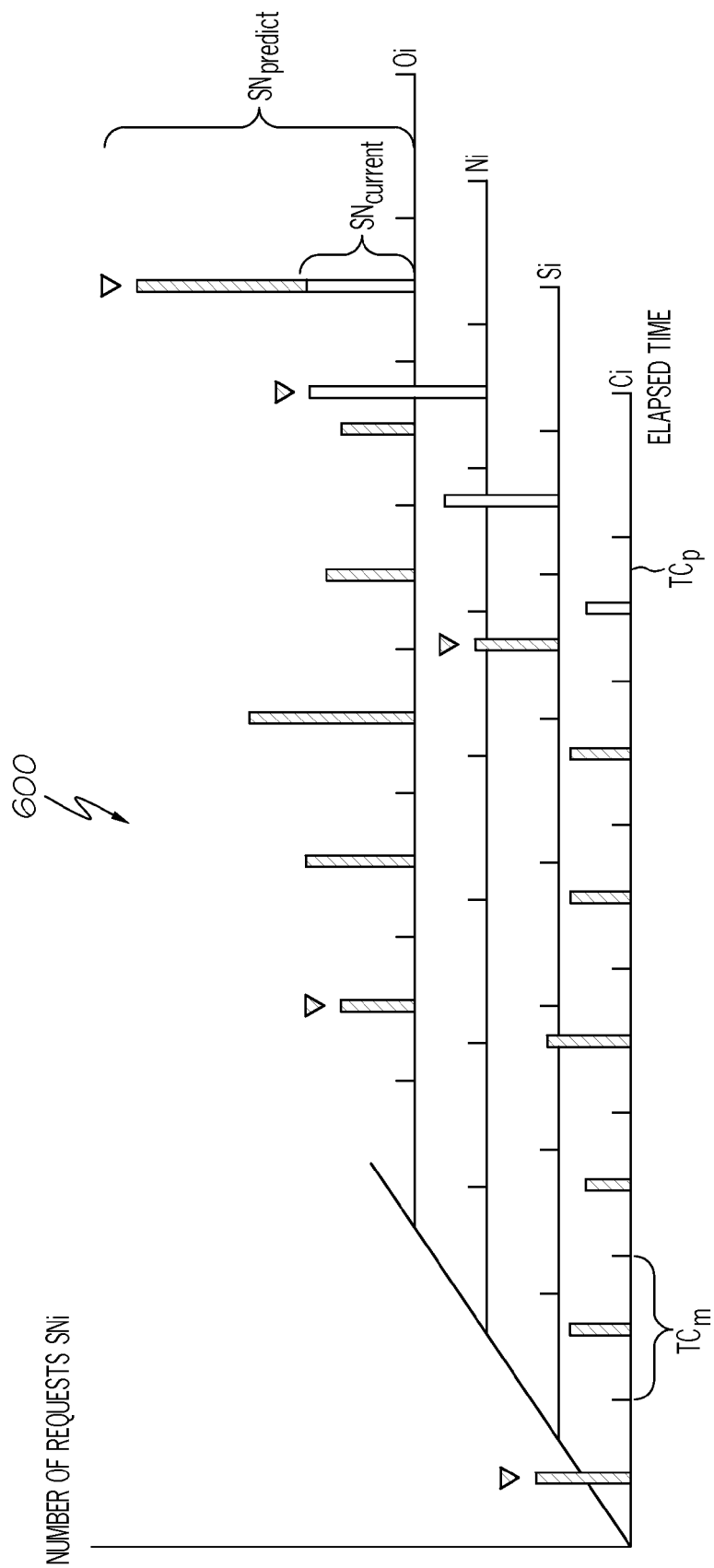
FIG. 6 is a diagram for illustrating a process for determining characteristics of a particular search target in a time chunk in which a request log is currently being accumulated from the rate of increase of original requests including the particular search target in a particular time chunk.

FIG. 6 shows an illustrative processing of determining the characteristics of a particular search target in a time chunk in which a request log 600 is currently being accumulated from the rate of increase of original requests including the particular search target in a particular time chunk. In FIG. 6, the vertical axis indicates the cumulative number of a search target included in original requests in a time chunk $TC_m$ (m=0, 2, 3, ..., n), and the horizontal axis indicates the time elapsed for the request log 600. The request log 600 is examined for each of the search targets $C_i$, $S_i$, $N_i$ and $O_i$. The cumulative number in each time chunk is indicated by a bar, and a solid bar indicates a time chunk for which the recording is already finished.

In FIG. 6, a time chunk determined to be singular with regard to a particular search target in the request log 600 is marked with a black triangle over the bar. The search target marked with the black triangle has not been requested yet and is detected for the first time in the time chunk marked with the black triangle. A time chunk indicated by a hollow bar is a time chunk in which the accumulation is currently being performed.

Even if a particular search request in the time chunk is determined to be singular at the end of the time chunk, the web server 150, or the like, can analyze the access log to determine the search intension of the issuer of the original request, since the original request has already been issued.

In this embodiment, the original requests are intercepted by the singularity assessing section 324 before reaching the web servers 150 to 154, and the singularity assessing section 324 determines the contents of the individual search requests. This enables the information processing apparatus 310 to determine the rate of increase of the search target included in the acquired original requests within a particular time chunk. That is, the singularity assessing section 324 counts the number of occurrences of a search value that specifies a particular search target, calculates the rate of increase thereof with respect to the total number of original requests, performs an appropriate extrapolation such as linear extrapolation, polynomial extrapolation and exponential extrapolation, and then integrates the extrapolation result over the time chunk in which the accumulation is currently being performed to predict the number of occurrences of the search value. In FIG. 6, the search target $O_i$ being accumulated in the last time chunk is marked with a white triangle in order to show that the search target will be determined to be singular at the end of the time chunk. If it is determined that the estimated number based on this prediction satisfies formula (1), above, the singularity assessing section 324 instructs the diffusion request generating section 316 to generate a diffusion request to start a processing of diluting the singularity level.

FIG. 6 shows that the number of occurrences $SN_{current}$ of the search target $O_i$ at this point in time in the time chunk currently being processed is not determined to be singular but is predicted to reach $SN_{predict}$ if the number increases at the current rate until the time chunk ends and will be determined to be singular when the number reaches $SN_{predict}$. In this case, the singularity level will be assessed by prediction in the time chunk in which the accumulation is currently being performed, so that the singularity diluting processing can be performed in the time chunk during recording of the request log for the time chunk, and thus gentle information leakage can be prevented.

The diffusion request generating section 316 in this embodiment determines the singularity of each individual search target included in the original request and generates a diffusion request if it determines that the search target is singular. The diffusion request is generated by modifying the original request so that the information searched for does not appear singular in the request log 500. In an illustrative implementation, the modification of the original request may be performed as described below.

In the case where a request for map information or the like is issued in the form of numerical data, a single dummy request or a plurality of dummy requests including dummy values are produced by modifying the numerical data into a random value out of the numerical value range in which search targets are determined to be the same. In a more preferred embodiment, a plurality of dummy values is selected so as to provide a uniform frequency spectrum when the latitude and longitude are Fourier-transformed, and the dummy values are incorporated into the diffusion request. Actually, a frequency spectrum uniform, to some extent, can make data mining difficult, so that the frequency spectrum does not always have to be completely uniform.

In the case of acquiring information with such an attribute that the corresponding value itself has to be acquired, such as company information and stock price information, a dummy request is generated by randomly extracting from the dummy generating information storage section 322 company names, stock names and stock codes classified into the same category of business as the company, the stock name or the like that is the search target determined to be singular, and acquiring an appropriate number of pieces of dummy information so as to make the number of occurrences of the request in the class white noise.

Although the dummy request can be composed of the same set of search values as that of the original request, the dummy request can also be generated as a search request including a single search value, since the information processing apparatus 310 separately accesses each individual database. The generated dummy requests include the search value indicating the true search target and other randomly selected values and are sent to the respective corresponding databases 160, 162, and 164 or 240, 242, and 244.

Figure 7:
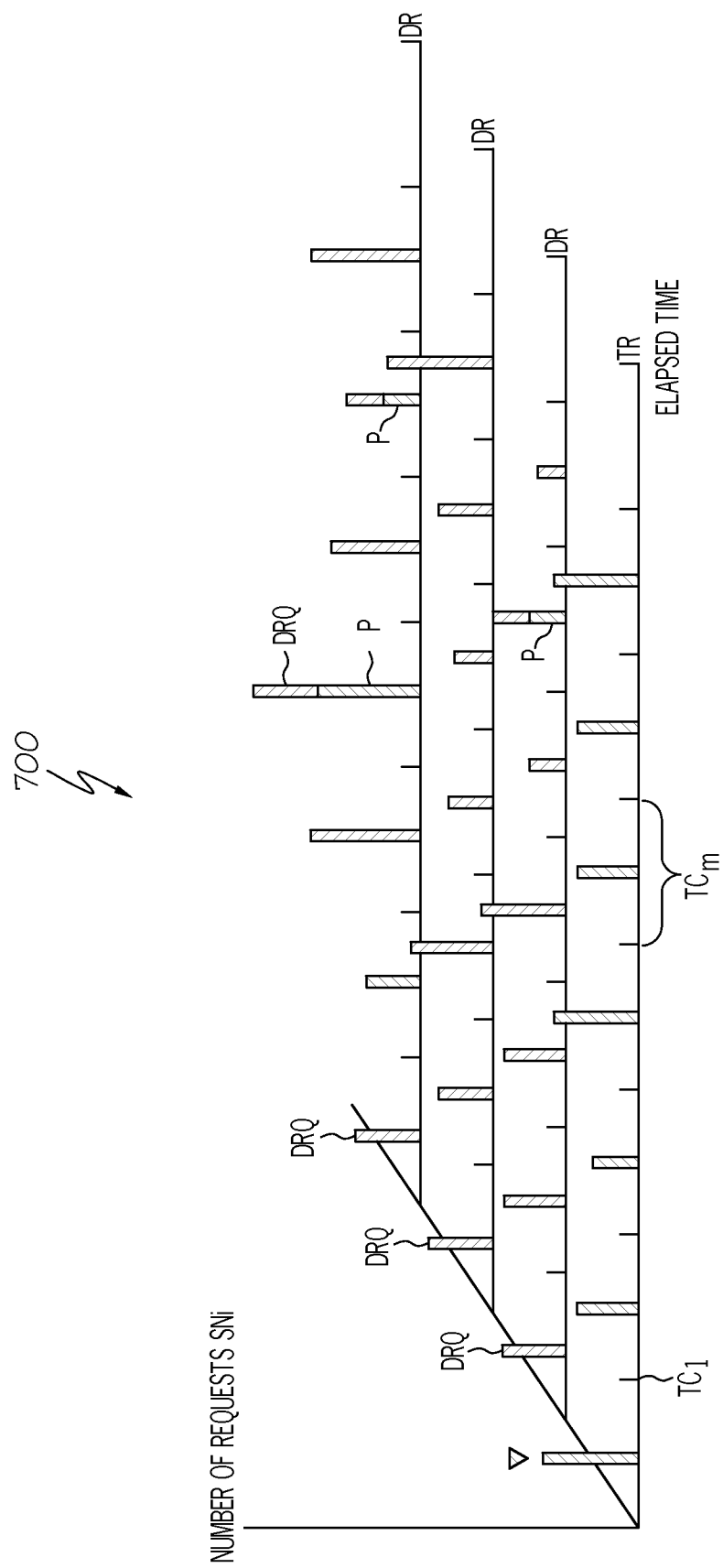
FIG. 7 is a diagram showing an embodiment of an access log recorded by a web server after a diffusion request is issued for a request log shown in FIG. 5 or 6.

FIG. 7 is an embodiment of an access log 700 recorded by the web server 150 or the like after a diffusion request is issued for the request log 500 or 600 shown in FIG. 5 or FIG. 6, according to this embodiment. The information processing apparatus 310 detects and counts the number of requests sent to the company information providing server 150 for each search target on a time chunk basis, and determines the statistical singularity of the search targets included in the original requests. If there is a search target determined to be singular, the information processing apparatus 310 issues a dummy request to dilute the singularity of the search target, thereby diluting the singularity of the access, that is, making the access log white noise so that any particular search value does not show a remarkable trend even if the access log with regard to a particular issuer is analyzed on the web server 150, as shown in FIG. 7.

Even when the original request includes a search target considered to be a dummy value for a true request TR, the information processing apparatus 310 generates a dummy request so as to bring the access log accumulated in the web server 150 as an access log for the particular information processing apparatus 310 closer to white noise. The "true request" means a request that is a search value included in the original request and reflects a particular intention of the searcher. If the information processing apparatus 310 determines that a true request $TR_1$ in a time chunk $TC_1$ is singular, the information processing apparatus 310 extracts a search target that is likely to dilute the singularity from the dummy generating information storage section 322 and incorporates the search target into a dummy request DR.

Figure 8:
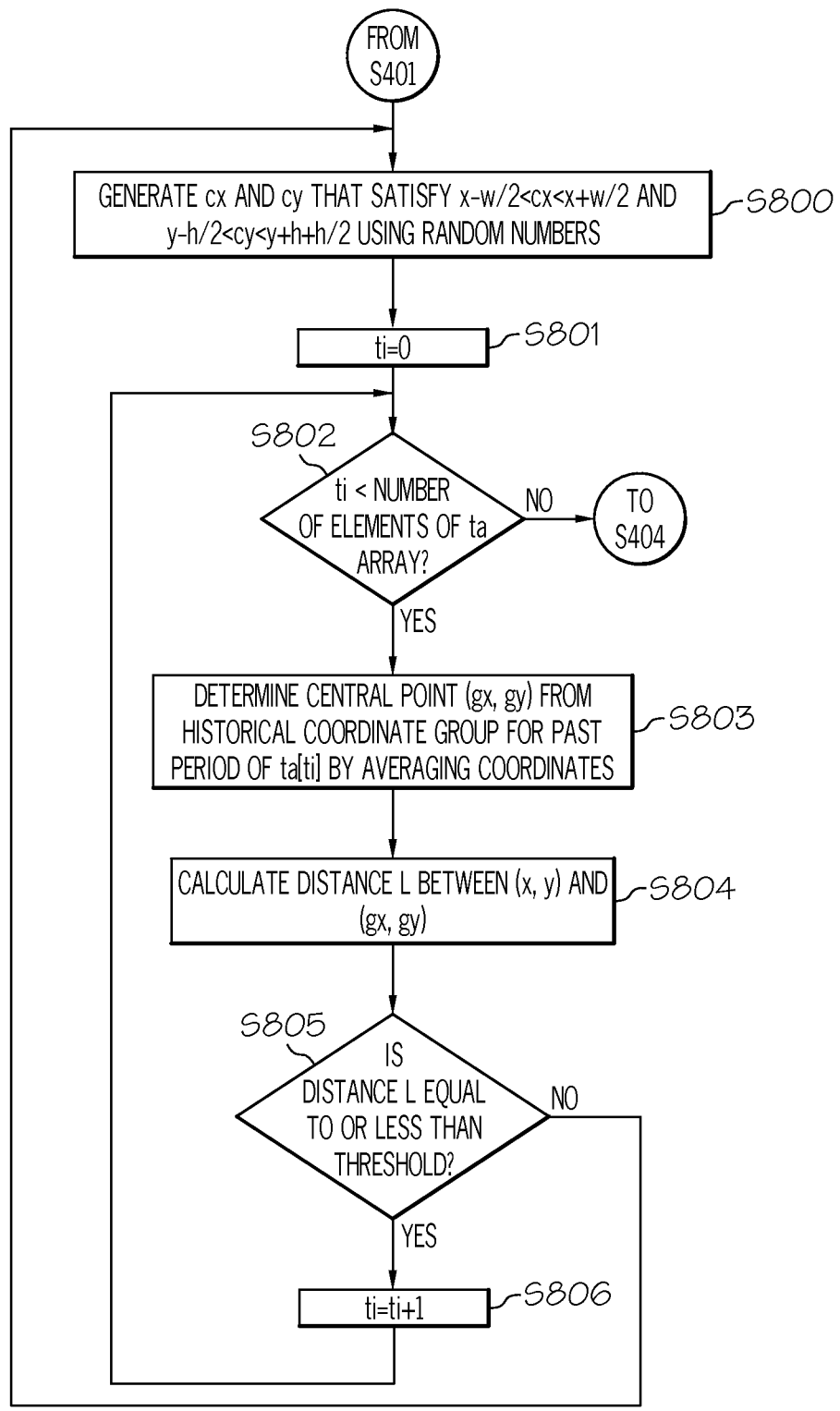
FIG. 8 is a detailed flow chart for illustrating a process from acquisition of the original request to issue of a request in the case where information associated with particular numerical value data is searched.

FIG. 8 is a detailed flow chart for illustrating a process from acquisition of an original request to issue of a request in the case where information associated with particular numerical value data is searched for according to this embodiment. For example, the process shown in FIG. 8 can be applied to map data characterized by a numerical value data set such as position coordinates and continuous information specified by numerical value data. In the embodiment shown in FIG. 8, the input values may be, for example, longitude and latitude values or may be a company name or place name. In the case where a company name, a place name, an address or the like is input as the original request, the process can be carried out by replacing the input value with latitude and longitude data stored in the dummy generating information storage section 322.

The process shown in FIG. 8 is a detailed description of the processing in steps S402 and S403 shown in FIG. 4 and starts after the original request is acquired in step S401. In step S800, values cx and cy that satisfy the following formula 3 are generated by using a function rnd( ).

$$x-w/2 < cx < x+w/2$$
$$y-h/2 < cy < y+h/2 \quad (3)$$

In the above-described formula (3), (x, y) represents numerical data specified by the original request, and w and h represents values that specify a range of the numerical data. cx and cy are numerical value data generated using random numbers and correspond to longitude and latitude values, for example. The center of gravity of coordinates including the past history (average coordinates) are represented by gx and gy.

In step S801, a timescale index ti is initialized to 0. The timescale index ti is defined in units of minute, hour, day, month or the like and defines the timescale for going back to the past for determining the singularity of the original request. More specifically, t0, t1 and t2 represent timescales of one minute, one hour and one day of request log to be referred to, respectively. In addition, t3 or t4 may be used to represent timescales of one month or one quarter of a year of request log to be referred to.

In step S802, it is determined whether or not ti exceeds the number of elements of a ta ARRAY. If ti is smaller than the number of elements of the ta ARRAY (if YES in step S802), in step S803, new coordinates gx and gy of the central point are calculated from a historical coordinate group for the past period of ta[ti] and the numerical value data cx and cy by using an average value of the values of the coordinate group. Then, in step S804, the distance L between the point (x, y) and the point (gx, gy) is calculated. In the case where the search values are given as a coordinate group, the distance L and the number of occurrences of requests for the distance L provide a measure of the singularity of the original request and are statistically processed as probable errors. The distance L used in this embodiment may be a Euclidean distance, a Manhattan distance or an appropriate topological distance defined between characteristic values defined by characteristic coordinate axes.

If it is determined in step S805 that the distance L is equal to or smaller than a threshold that is a criterion for determining that the original request is not singular (if YES in step S805), the timescale index ti is incremented by 1 in step S806, and then, the process returns to step S802 to determine the singularity on another timescale. If it is determined in step S805 that the distance L is not equal to or smaller than the threshold (if NO in step S805), the process returns to step S800, additional cx' and cy' are generated, and the calculation is repeated until the distance L becomes equal to or smaller than the threshold.

If it is determined in step S802 that the calculation for the set timescale index is finished (if NO in step S802), it means that no singularity is found in any periods on the set timescale, and therefore, the control is passed to step S404 (see FIG. 4), and numerical value data in the form of a set {(cx, cy)} is set in a search query and is issued as the diffusion request. In this embodiment, the information is continuous in numerical value, and, therefore, the values (x, y) of the original request are not included in the diffusion request.

By performing the process shown in FIG. 8, the information processing apparatus 310 can acquire the information requested by the original request without sending the numerical value data specified in the original request to the web servers. The process shown in FIG. 8 can be effectively applied if the information can be specified by numerical value data and has a topologically continuous attribute. Preferred applications of the process shown in FIG. 8 include map search. In another preferred application of this embodiment, in the case where the extracted set (cx, cy) includes data that can be rounded to particular landmark position coordinates other than (x, y), the information retrieved by placing the landmark in a region indicated by (w, h) can be displayed.

FIG. 9 shows pseudo code used in the processing of steps S803 to S805 of the process described with reference to FIG. 8. A pseudo code block 900 corresponds to the processing in steps S804 and S805, and a pseudo code block 910 corresponds to the processing in step S88 03 shown in FIG. 8. In the block 910, "variable=list. number of included elements ( )" represents the number of elements of the request log included in the timescale specified by ti.

Figure 10:
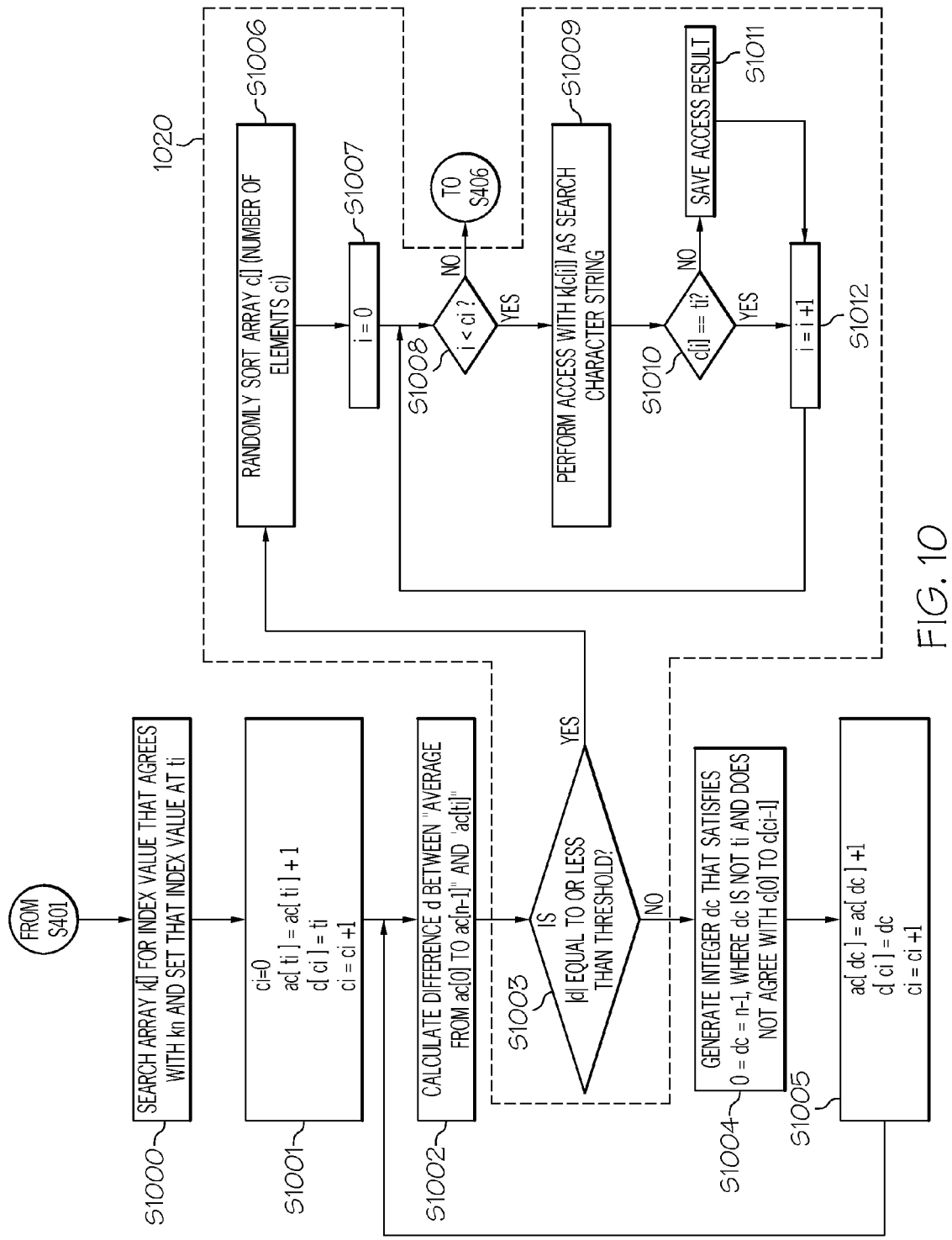
FIG. 10 is a flow chart for illustrating another embodiment of the information search method.

FIG. 10 is a flowchart for illustrating a second embodiment of the information search method, which corresponds to steps S402 to S405 in FIG. 4. The embodiment shown in FIG. 10 can be preferably applied in the case where the information searched for has a discrete attribute. The process shown in FIG. 10 starts at step S1000 after the original request is acquired in step S401. The symbols used in FIG. 10 are defined as shown in Table 1 below.

TABLE 1

| | |
|---|---|
| kn: | True access target attribute name |
| Output result: | Access result |
| N: | Number of attribute names belonging to same category |
| k[ ]: | Array of attribute names belonging to same category {0-(N − 1)} |
| ac[ ]: | Array of access counts for each attribute name {0-(N − 1)} |
| ti: | Index value of access target attribute name in attribute name array |
| ci: | Number of access candidates |
| c[ ]: | Access candidate index array |
| d: | Index value of generated candidate |
| i: | Loop index |

In step S1000, the index value of an attribute that agrees with kn is acquired from the array k[ ] and set at a variable ti. In step S1001, the number of access candidates to be extracted as dummy requests is initialized to null, the access count corresponding to the index value ti is set at 1, and the index value ti is set on the assumption that the index in the access candidate index array=0. Then, the number of access candidates is incremented by 1. In step S1002, the difference between the access count and the average value thereof is calculated according to d=|Avg(ac[0], ac[n−1])−ac[ti]|.

In step S1003, it is determined whether or not |d| is equal to or smaller than a threshold. If it is determined that |d| is not equal to or smaller than the threshold (if NO in step S1003), in step S1004, an index value that specifies the attribute name to be extracted as a dummy request is given, and an integer value that satisfies the conditions that $0 \leq dc \leq N-1$, $dc \neq ti$, and the value has not been extracted yet is generated by using a rnd( ) function. The threshold may be the probable error of the request log described in the formula (1). However, in the case where a different criterion is used for determining the singularity, another suitable threshold can be used.

In step S1005, the value corresponding to the index value dc of the access count array ac[ ] is updated, the index value dc is set at the value of the access candidate index array c[ci], the number of access candidates ci is incremented by 1, and the process returns to step S1002. The process described above is repeated until the result of the determination in step S1003 is positive.

If it is determined in step S1003 that |d| is equal to or smaller than the threshold (if YES in step S1003), the process branches to step S1006, in which ci elements of the array c[ ] are randomly sorted, and the history of extraction of the access candidates is erased. Then, in step S1007, the loop index i is initialized to 0. Then, if it is determined in step S1008 that the loop count i is smaller than ci, in step S1009, k[c[i]] is set as a search character string of a request forming the diffusion request, and access to the web servers is performed. In step S1010, it is determined whether or not c[i] is equal to ti. If it is determined that c[i]==ti (if YES in step S1010), in step S1012, the loop count is incremented by 1, and the process returns to step S1008. Dummy accesses continue to be performed until the result of the determination in step S1008 is negative.

If it is determined in step S1010 that c[i] is not equal to ti (if NO in step S1010), the access result is saved in step S1011, and the process proceeds to step S1012. Then, again, the process is repeated until the result of the determination in step S1008 is negative. If a negative result is returned in step S1008 (if NO in step S1008), the control is passed to step S406, and the process shown in FIG. 10 is finished. The process shown in FIG. 10 has been described on the assumption that the access target attribute name is treated outside the process shown in FIG. 10. However, processing of all the access candidates can be completed within the process shown in FIG. 10 by omitting the processing in step S1010 and saving all the access results.

Furthermore, in the determination in step S1003, the access history can be diffused over the timescale by using the timescale index for calculating the average value as described with regard to step S803 in FIG. 8.

FIG. 11 shows illustrative pseudo code for performing the process shown in FIG. 10. A block 1100 corresponds to the processing step S1003 in FIG. 10, and a block 1110 corresponds to the processing in step S1020 in FIG. 10. Although the pseudo code shown in FIG. 11 is shown as performing access to the search target attribute name after the block 1110 is finished, the data mining resistance can be improved if the access is performed within the processing loop of the block 1110 as described above with reference to FIG. 10.

Figure 12A:
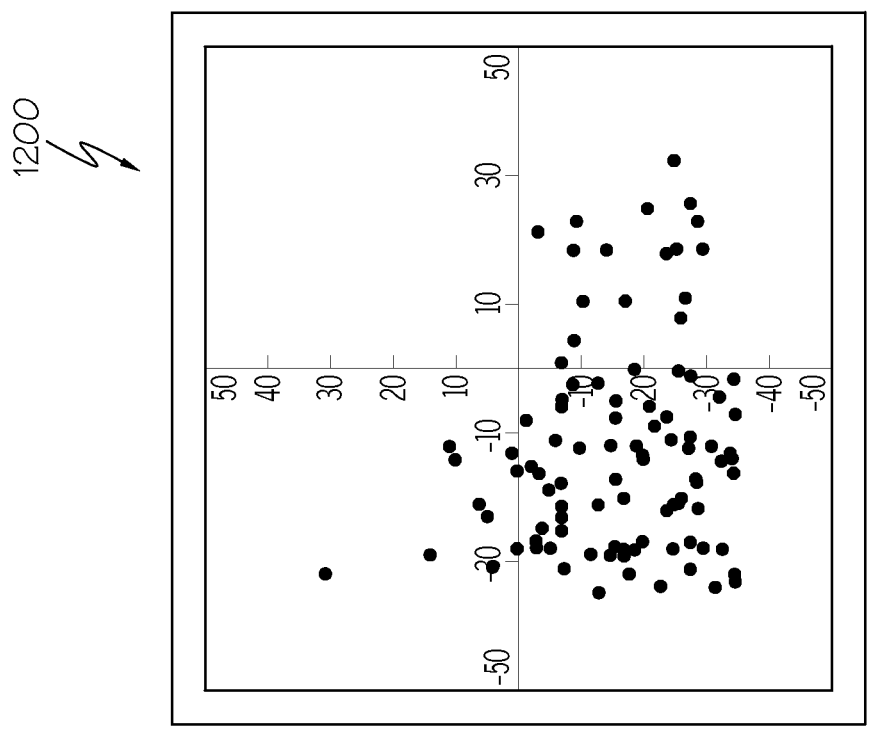
Figure 12C:
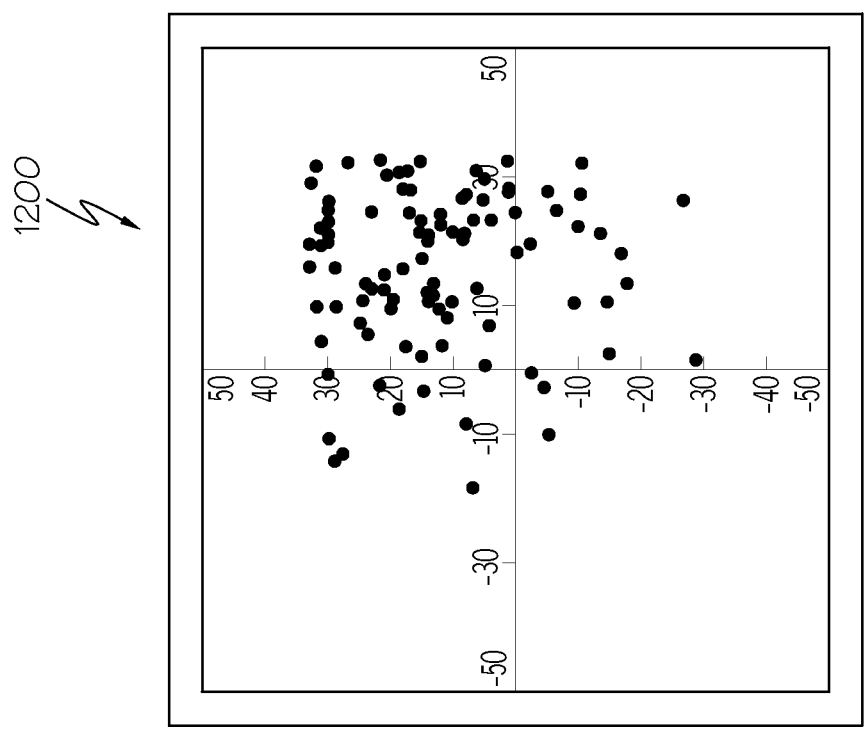

FIGS. 12A, 12B, and 12C show diffusion conditions of the contents of diffusion requests generated in an embodiment in which map data is searched for. In FIGS. 12A, 12B, and 12C, the vertical axis and the horizontal axis correspond to the vertical dimension h and the horizontal dimension w of the display region, respectively. FIGS. 12A, 12B, and 12C show different diffusion conditions under different initial conditions for generating random numbers. As shown in FIGS. 12A, 12B, and 12C, the diffusion requests include position coordinates sufficiently distant from the target coordinates (0, 0) given as the original request, and the points of the dummy requests forming the diffusion requests are sufficiently randomly distributed. Thus, the data mining resistance of the request can be improved.

Figure 13:
FIG. 13 is a diagram showing an illustrative search screen displayed by the web system according to one embodiment.

FIG. 13 shows an illustrative search screen 1300 displayed by the web system according to this embodiment. The screen shown in FIG. 13 is an example of an information search in which the contents of the request are set as numerical value data, and continuous information is searched for. In the example shown in FIG. 13, a landmark 1312 is the search target. In the web system according to this embodiment, the operator of the information processing apparatus 310 inputs the position coordinates, the company name or the like of the search target 1312. Once the position coordinates, the company name or the like is input, the information processing apparatus 310 determines whether or not the search target 1312 is a singular access by history analysis of the request log according to the process shown in FIG. 8.

The information processing apparatus 310 determines that the access to the search target 1312 is singular (|d|>threshold), extracts by filtering the response to the request corresponding to the position coordinates registered as the landmark 1314 from the position coordinates extracted as access candidates, and displays it as a map image 1310. The diffusion requests, issued by the information processing apparatus 310, are issued in the form of a request set generated according to the process shown in FIG. 8 and improves the data mining resistance of the request relating to the search target 1312.

The user having acquired the map image 1310 scrolls the map data with a mouse or the like to move to a landmark 1316 such as a park to place the search target 1312 around the center so that the map data 1320 is displayed. The map data registered is continuous on a two-dimensional plane, and therefore, scrolling the map data does not involve any value that specifies the search target as requesting but involves transmitting a relative value for achieving a movement with respect to default map data. Since any data that specifies the search target 1312 is not transmitted to the web servers, scrolling has no effect on the data mining resistance.

Figure 14:
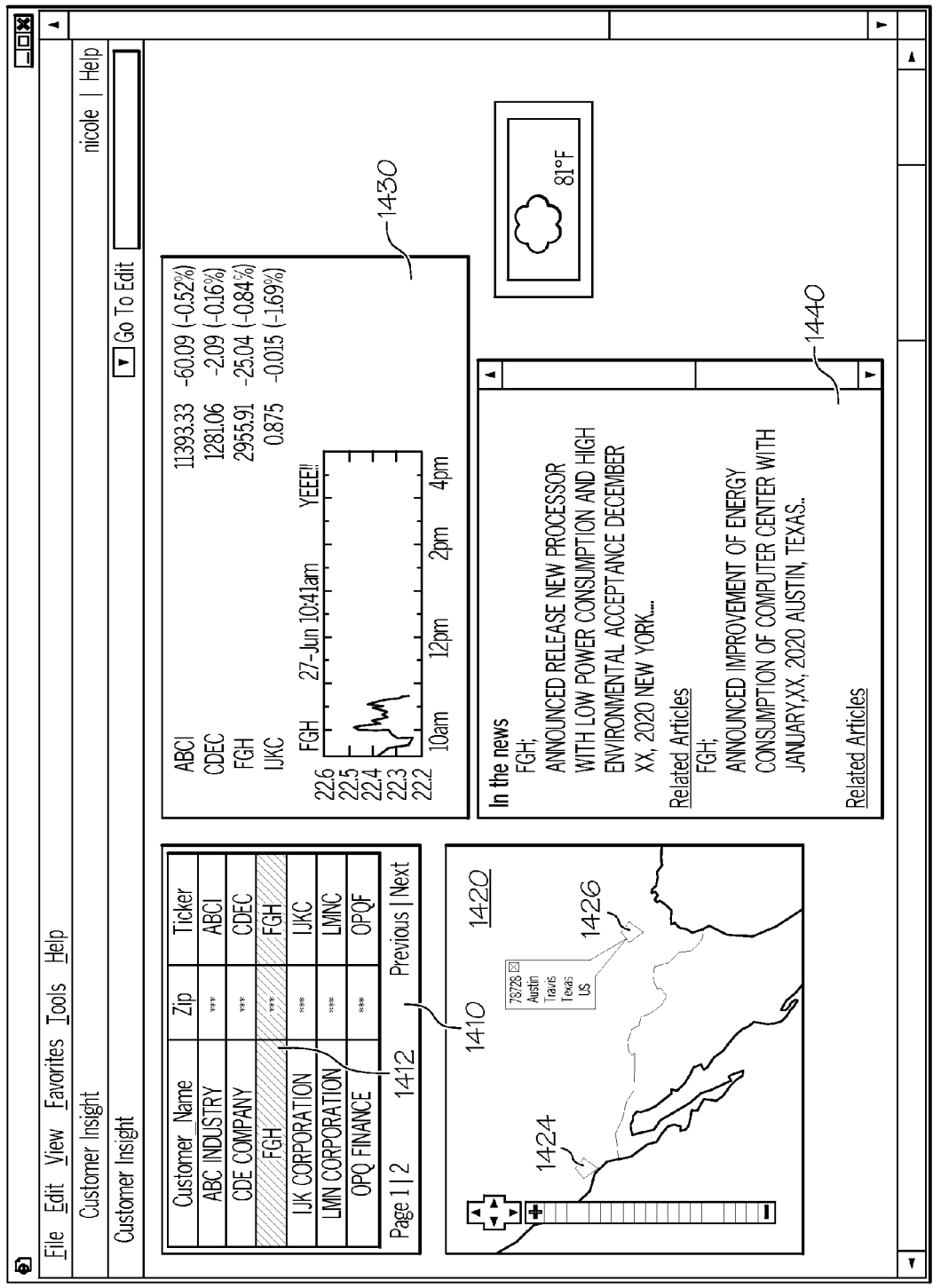
FIG. 14 is a diagram showing an example in which the search target has a discrete attribute according to one embodiment.

FIG. 14 shows an example in which the search target has a discrete attribute. In the example shown in FIG. 14, information acquired from a plurality of web servers is mashed up by the mashup server 130 and provided as one desktop screen 1400. In the embodiment shown in FIG. 14, the operator searches for stock price information on a particular company "FGH" located at Los Angeles. In the example shown in FIG. 14, the operator inputs a search character string representing FGH, the stock price, a map and a topic, but the mashup server 130 does not send the original request input by the operator as it is. Instead, the mashup server 130 refers to information and the request log stored in the dummy generating information storage section 322 to acquire a company name for which stock price or other information is to be acquired other than the search target company name "FGH" as an access candidate and issues a search request to the web servers in the form of a diffusion request.

In the embodiment described with reference to FIG. 14, the search results of the process described above are not filtered, and all the search results are acquired and displayed in a display frame 1410 in the form of a search result list ordered in accordance with the requests sent randomly. As shown in the display frame 1410, the search result for the search target company "FGH" is mixed with the search results for the other companies, the relative weight of the requested search target company name "FGH" in the access log is reduced. In addition, according to this embodiment, since the diffusion request obtained by statistically processing the request log is sent to the web server, the resistance to data mining for access log analysis by the web server having received the request can be improved. randomly. As shown in the display frame 1410, the search result for the search target company "FGH" is mixed with the search results for the other companies, the relative weight of the requested search target company name "FGH" in the access log is reduced. In addition, according to this embodiment, since the diffusion request obtained by statistically processing the request log is send to the web server, the resistance to data mining for access log analysis by the web server having received the request can be improved.

In display frames 1420, 1430 and 1440, the position on the map, the stock price variation and the topics corresponding to the search result currently selected by the operator in the search result list in the display frame 1410 are displayed, respectively. The operator can select another search result in the display frame 1410 to change the display contents in the display frames 1420, 1430 and 1440, so that the independent information from the plurality of web servers can be efficiently presented.

Figure 15:
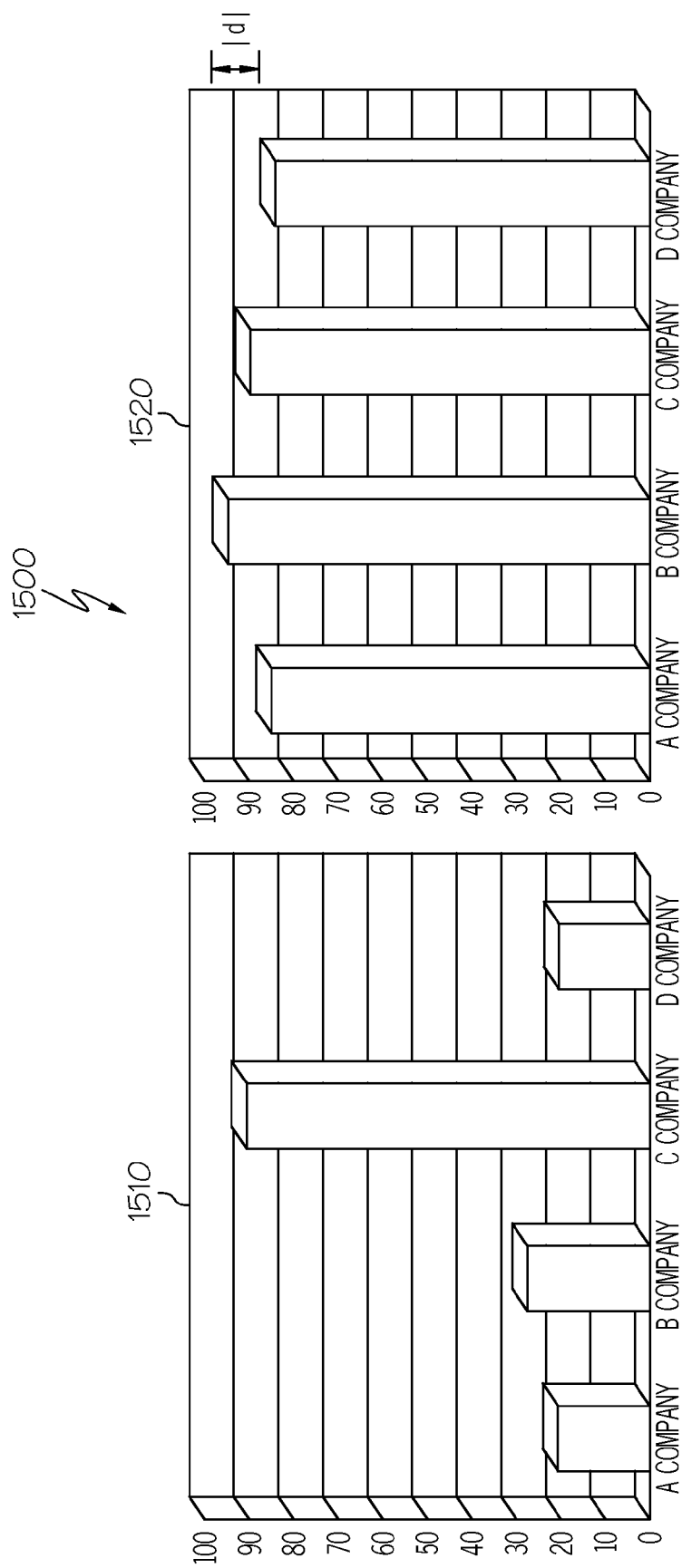
FIG. 15 is a diagram showing an illustrative access log generated as a result of issue of the diffusion request according to the information processing method of one embodiment.

FIG. 15 shows access logs 1500 generated as a result of issuing of the diffusion request for illustrating the effect of the information processing method according to this embodiment on improvement of the data mining resistance intended for preventing gentle information leakage through the access log. In FIG. 15, an access log 1510 is an access log in a particular web server in the case where the diffusion request according to this embodiment is not used, and an access log 1520 is an access log in the particular web server in the case where the diffusion request according to this embodiment is used. In FIG. 15, the vertical axis indicates the total number of accesses for each search character string in a particular period.

For convenience of description, it is assumed that the company names included in the diffusion request are A company, B company, C company and D company, and the search target company name is C company.

Referring to the access log 1510, the search target company name input by the operator is transmitted to the web server as it is, so that the requests including the search target company name are remarkably recorded in the access log. Therefore, changes of the search target of a particular enterprise or individual can be traced on the web server side by chronological data mining of the access log. For example, if the number of accesses to C company increases after a particular date and time, the fact that the searcher becomes interested in C company after the particular date and time leaks to the site operating the web server, so that important information concerning a possible takeover bid (TOB) or merger may gently leak.

The access log 1520 is an access log generated on the web server side in the case where the diffusion request according to this embodiment is used. In this embodiment, the request log is statistically processed to generate a diffusion request, and the request set is issued to the web server. As a result, the frequency of accesses to the companies are leveled so that the differences therebetween are below a threshold |d| that defines a particular singularity, and the data mining resistance of the access log is improved. Although FIG. 15 shows the company names as an example, this embodiment can be applied to other various types of information, such as geographical name/area name, product name, age, sex, group name and a particular character string concerning SNS, and gentle leakage of information about the intension of a search concerning market research, future trend, company activity and network activity can be prevented.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. An information processing apparatus for acquiring information over a network, comprising:
   a processor; and
   memory connected to the processor, wherein the memory is encoded with instructions and wherein the instructions when executed comprise:
   instructions to acquire an original request including a current search value that specifies information to be acquired from a database;
   instructions that determine said information to be acquired by said original request is singular with respect to a request previously issued by the information processing apparatus as stored in a request log in which a history of search values is registered;
   when said original request is determined to be singular with respect to said current search value, instructions that generate a diffusion request comprising a dummy request, to dilute singularity in an access log related to said current search value to said database, said dummy request being generated from a dummy value that provides a different search value requesting information different from said information to be acquired, wherein said instructions that determine singularity search said request log for said current search value included in said original request and cause said instructions that generate a diffusion request to start generating said dummy request when said instructions that determine singularity predicts from a rate of increase of occurrences of said current search value that a number of occurrences of said current search value becomes at least a threshold value greater than an average value of said number of occurrences of said search value, and wherein said dummy value is stored in a dummy generating information storage section and provides data mining resistance by reducing said singularity of said search value in said request log;
   when said information to be acquired has a discrete attribute, instructions to issue said diffusion request as a search request to said database over the network comprising instructions to include said original request and said dummy request as said search request; and
   instructions to extract search result information acquired by said diffusion request from a response to said search request.

2. The apparatus of claim 1, wherein when said information to be acquired has a continuous attribute, said instructions to issue said diffusion request as a search request comprise instructions to include only said dummy request as said search request.

3. The apparatus of claim 1, comprising instructions that include a plurality of search values that acquire different kinds of information in said original request, said instructions that determine singularity determining singularity for each of said plurality of search values, said dummy request is generated for each of said search values, and said diffusion request is issued to each of a plurality of databases to be searched for information specified by said search values.

4. The apparatus of claim 3, wherein the information processing apparatus receives responses corresponding to said search values included in said original request from said databases, creates display regions for displaying the responses, and displays said responses.

5. The apparatus of claim 4, wherein the information processing apparatus is a mashup server implemented according to a Web 2.0 paradigm.

6. A method of acquiring information over a network, comprising:
- acquiring, using a processor, an original request that includes a current search value specifying information to be acquired from a database;
- determining that said information to be acquired by said original request is singular with respect to a request previously issued by the information processing apparatus as stored in a request log in a memory in which a history of search values is registered;
- when said original request is determined to be singular with respect to said current search value, generating a diffusion request comprising a dummy request, to dilute singularity in an access log related to said current search value to said database, said dummy request being generated from a dummy value that provides a different search value requesting information different from said information to be acquired, wherein said determining singularity searches said request log for said current search value included in said original request and causes said generating a diffusion request to start generating said dummy request when said determining singularity predicts from a rate of increase of occurrences of said current search value that a number of occurrences of said current search value becomes at least a threshold value greater than an average value of said number of occurrences of said search value, and wherein said dummy value is stored in a dummy generating information storage section and provides data mining resistance by reducing said singularity of said search value in said request log;
- when said information to be acquired has a discrete attribute, issuing said diffusion request as a search request to said database over the network including said original request and said dummy request as said search request; and
- extracting search result information acquired by said diffusion request from a response to said search request.

7. The method of claim 6, wherein when said information to be acquired has a continuous attribute, issuing said diffusion request comprises issuing a diffusion request comprising only said dummy request as said search request.

8. The method of claim 6, wherein said original request comprises a plurality of search values to acquire different kinds of information, said determining whether or not said information to be acquired is singular comprises determining singularity for each of said plurality of search values, said generating a diffusion request comprises generating said dummy request for each of said plurality of search values, and said issuing said diffusion request comprises issuing said diffusion request to each of a plurality of databases to be searched for information specified by said search values.

9. The method of claim 8, wherein said processor comprises a mashup server implemented according to a Web 2.0 paradigm.

10. The method of claim 8, wherein responses corresponding to said search values included in said original request are received from said databases and display regions are created for displaying said responses.

11. A computer program product for acquiring information over a network, the computer program product comprising a computer readable storage device having computer readable program code embodied therewith, the computer readable program code comprising:
- computer readable program code configured to acquire an original request comprising a current search value that specifies information to be acquired from a database;
- computer readable program code configured to determine that said information to be acquired by said original request is singular with respect to a request previously stored in a request log in which a history of search values is registered;
- when singularity with respect to said current search value is determined, computer readable program code configured to generate a diffusion request comprising a dummy request, to dilute singularity in an access log related to said current search value to said database, said dummy request being generated from a dummy value that provides a different search value that requests information different from said information to be acquired, wherein said computer readable program code configured to determine singularity searches said request log for said current search value included in said original request and causes said computer readable program code configured to generate a diffusion request to start generating said dummy request when said computer readable program code configured to determine singularity predicts from a rate of increase of occurrences of said current search value that a number of occurrences of said current search value becomes at least a threshold value greater than an average value of said number of occurrences of said search value, and wherein said dummy value is stored in a dummy generating information storage section and provides data mining resistance by reducing said singularity of said search value in said request log;
- when said information to be acquired has a discrete attribute, computer readable program code configured to issue said diffusion request as a search request to said database over a network comprising computer readable program code configured to include said original request and said dummy request as said search request; and
- computer readable program code configured to extract information acquired by said diffusion request from a response to said search request.

12. The computer program product of claim 11, wherein when said information to be acquired has a continuous attribute, said computer readable program code configured to issue said diffusion request comprises only said dummy request as said search request.

13. The computer program product of claim 11, wherein said original request includes a plurality of search values for acquiring different kinds of information, computer readable program code configured to determine singularity for each of said plurality of search values, said dummy request is generated for each of said search values, and said diffusion request is issued to each of a plurality of databases to be searched for information specified by said search values.

14. The computer program product of claim 13, wherein the information processing apparatus receives responses corresponding to said search values included in said original request from said databases, creates display regions for displaying the responses, and displays said responses.

15. The computer program product of claim 14, further comprising a mashup server implemented according to a Web 2.0 paradigm.

* * * * *